Feb. 26, 1963  C. J. HEINRICH  3,078,977
FLEXIBLE WHEEL-TYPE GRAVITY CONVEYORS
Filed May 22, 1962  5 Sheets-Sheet 1

INVENTOR.
CHESTER J. HEINRICH
BY
Edward F. Costigan
ATTORNEY

Feb. 26, 1963   C. J. HEINRICH   3,078,977
FLEXIBLE WHEEL-TYPE GRAVITY CONVEYORS
Filed May 22, 1962   5 Sheets-Sheet 2

INVENTOR.
CHESTER J. HEINRICH
BY
Edward F. Costigan
ATTORNEY

Feb. 26, 1963   C. J. HEINRICH   3,078,977
FLEXIBLE WHEEL-TYPE GRAVITY CONVEYORS
Filed May 22, 1962   5 Sheets-Sheet 3
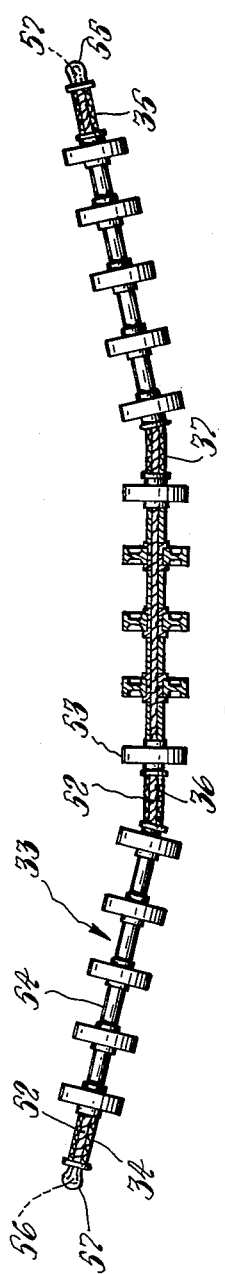
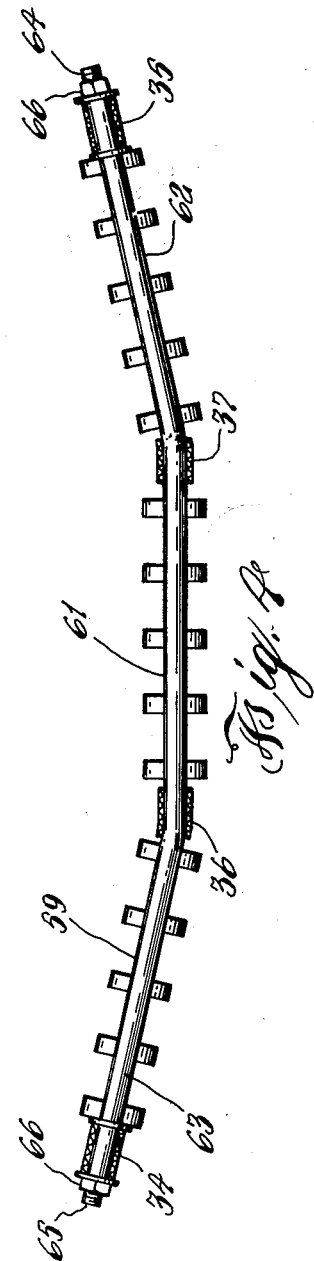
INVENTOR.
CHESTER J. HEINRICH
BY
Edward F. Costigan
ATTORNEY INVENTOR.
CHESTER J. HEINRICH
BY
Edward F. Costigan
ATTORNEY Feb. 26, 1963 C. J. HEINRICH 3,078,977
FLEXIBLE WHEEL-TYPE GRAVITY CONVEYORS
Filed May 22, 1962 5 Sheets-Sheet 5
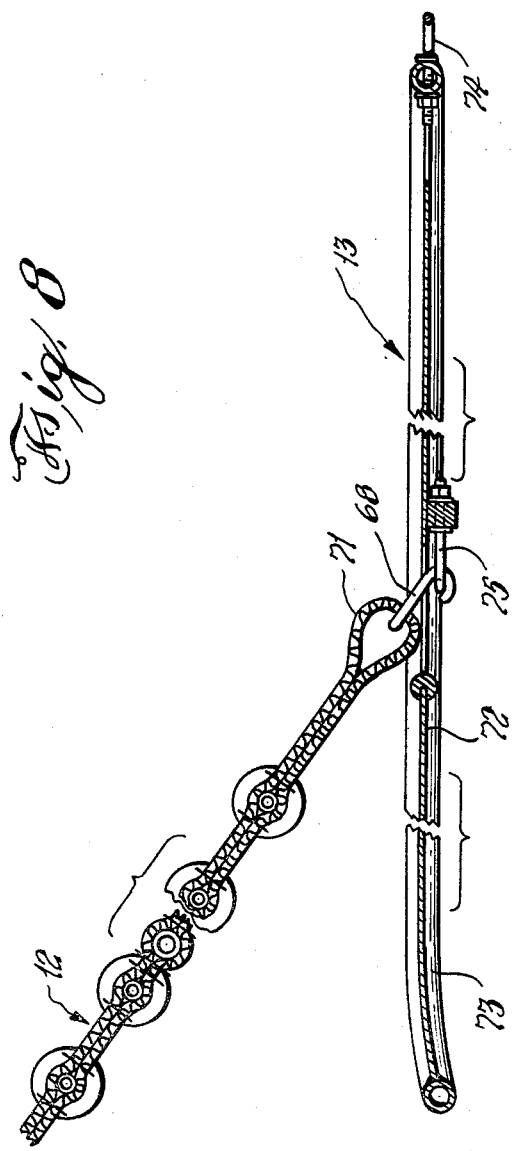
INVENTOR.
CHESTER J. HEINRICH
BY
Edward F. Costigan
ATTORNEY

United States Patent Office 3,078,977
Patented Feb. 26, 1963

3,078,977
FLEXIBLE WHEEL-TYPE GRAVITY CONVEYORS
Chester J. Heinrich, Wayne, N.J., assignor to the United States of America as represented by the Secretary of the Navy
Filed May 22, 1962, Ser. No. 196,838
13 Claims. (Cl. 193—35)
(Granted under Title 35, U.S. Code (1952), sec. 266)

The invention described herein may be manufactured and used by or for the Government of the United States for governmental purposes without the payment of any royalties thereon or therefro.

This invention relates to improvements in conveying apparatus, and particularly to an improved flexible wheel-type gravity conveyor.

A recent innovation in the field of gravity conveyors consists in a wheel-type conveyor having a flexible continuous track formed by a multiplicity of anti-friction wheel devices upon which various bulk articles, such as packages, boxes, and the like are positioned and caused to progress longitudinally on the track by gravitational forces. However, in many cases, it is extremely difficult to maintain a moving article on the conveyor between the loading station and the discharge station. This may be due to the fact that, in some cases, the operating personnel are negligent in loading the articles on the conveyor and do not take care to see to it that the articles are placed in the center of the conveyor. In other cases, the difficulty may be due to the weight distribution in the article, or due to the fact that the flexible track is slightly tilted. In either case, the moving articles exhibit a tendency to move more and more towards the edge of the conveyor as they proceed along the track until they fall off the conveyor at a point short of the discharge station.

An attempt has been made to overcome the difficulty heretofore encountered in the use of a flexible wheel type conveyor by forming a trough of two or more parallel flexible conveyor tracks. In this case, the adjacent longitudinal edges of each of the tracks had a common webbing member which served as a support means for the wheel devices of each of the adjacent tracks. This system of interconnected parallel tracks was unusually successful when the overall length of the conveyor was not very large. However, when the length of the conveyor was increased substantially, the central portion of trough formed by the adjacent tracks flattened out due to the combined weight of the tracks and the difficulties heretofore described were encountered once again.

It is readily apparent that a conveying system could not be considered truly practical if a number of the articles being transported were discharged at a distance short of the discharge station. This is especially true when the conveying system is used to transfer cargo from one ship to another while both are at sea. The loss in material and the overall weight of the conveying system would be obstacles which would prohibit the use of the system by the Navy.

These disadvantages are substantially overcome by the present invention, hereinafter described, with particular reference to the transfer of cargo between ships at sea, which is the most difficult use situs. However, it is to be understood that the use of the present invention is not limited to ship to ship cargo transfers, but that the invention has numerous advantages when employed in a use where either or both of the supply and receiving stations are immobile areas.

The subject invention comprises a light-weight wheel-type gravity conveyor formed by a flexible track consisting essentially of a multiplicity of anti-friction plastic wheel devices supported in spaced relationship on a plurality of flexible axles transversely disposed across at least two parallel webbing members, said conveyor track having a supply chute which directionally orients a package to the central area of the flexible track, a rigid rib type structure transversely supported between said webbing members which orients the conveyor track in the shape of a long shallow channel thereby maintaining the package in the center of the track as it progresses longitudinally along the conveyor, and a receiving platform which decreases the acceleration of the package and upon which the package is deposited in an undamaged condition.

The principal object of this invention is to provide a conveyor of improved construction adapted for use in the transfer of cargo from a supply station to a discharge station.

Another object is to provide a wheel-type flexible gravity conveyor of light construction for use in the transfer of cargo from a supply station to a discharge station.

A further object is to provide a wheel-type flexible gravity conveyor of comparatively light-weight having a long, shallow construction for use in the efficient transfer of cargo from a ship supply station to a ship receiving station.

Other objects and many attendant advantages of this invention will be readily appreciated as the same become better understood by reference to the following detailed description when considered in connection with the accompanying drawing, wherein:

FIG. 3 is a section of the apparatus taken on line 3—3 showing a skate wheel assembly which may be used in the conveyor track;

FIG. 4 is a section of the apparatus taken on line 4—4 showing a rigid rib which may be used to shape the body of the conveyor track;

FIG. 8 is a section of the apparatus taken on line 5—5 showing the conveyor track in operative relationship with respect to the receiving platform.

Similar numerals refer to similar parts throughout the several views.

Figure 1:
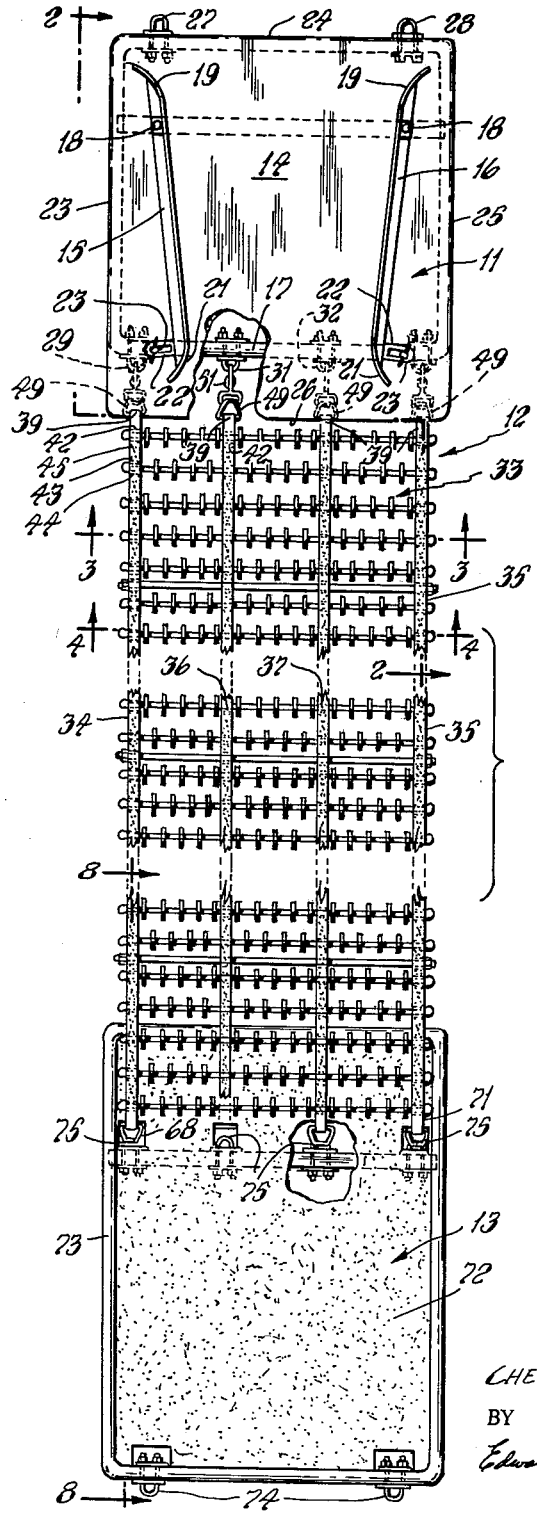
FIG. 1 is a fragmentary plan view of a conveying apparatus, showing a preferred embodiment of the invention.

The preferred embodiment of the conveyor as shown in FIG. 1, comprises a delivery chute 11, a flexible conveyor track 12, and a receiving platform 13.

The delivery chute 11 consists of a flat platform 14 having guide rods 15 and 16 mounted on the upper surface of the platform and a frame 17 secured to the undersurface of the platform. The guide rods 15 and 16 are pivotally secured to the platform by means of pins 18 which pass through the end portion 19 of each of the rods. The horizontal movement of the free end 21 of each of the rods is adjustably controlled by means of a slotted guide 22 and a securing means 23 such that the distance between the free ends 21 of the rod may be substantially decreased. The rigid frame 17, which is tubular in structure, is secured along the peripheral portion of three sides 23, 24 and 25 of the platform while a substantial portion of the fourth side 26 overhangs the rigid frame 17. The platform 14 is secured to the loading station through the use of U bolts 27 and 28 which pass through the rigid frame 17 and the track is secured to the platform through the use of U bolts 29, 31 and 32 while the free end or fourth side 26 of the platform overhangs a portion of the flexible conveyor track 12 in the manner shown in FIGS. 1 and 2. The overall function of the delivery chute 11 is to guide or directionally orient a package to the central portion of the flexible conveyor track. During the cargo transfer operation, a package is taken from the loading station and placed on the upper portion of the delivery chute between the guide rods 15 and 16. The package then will progress longitudinally along the platform by means of gravity to the central portion of the conveyor track 12.

Figure 2:
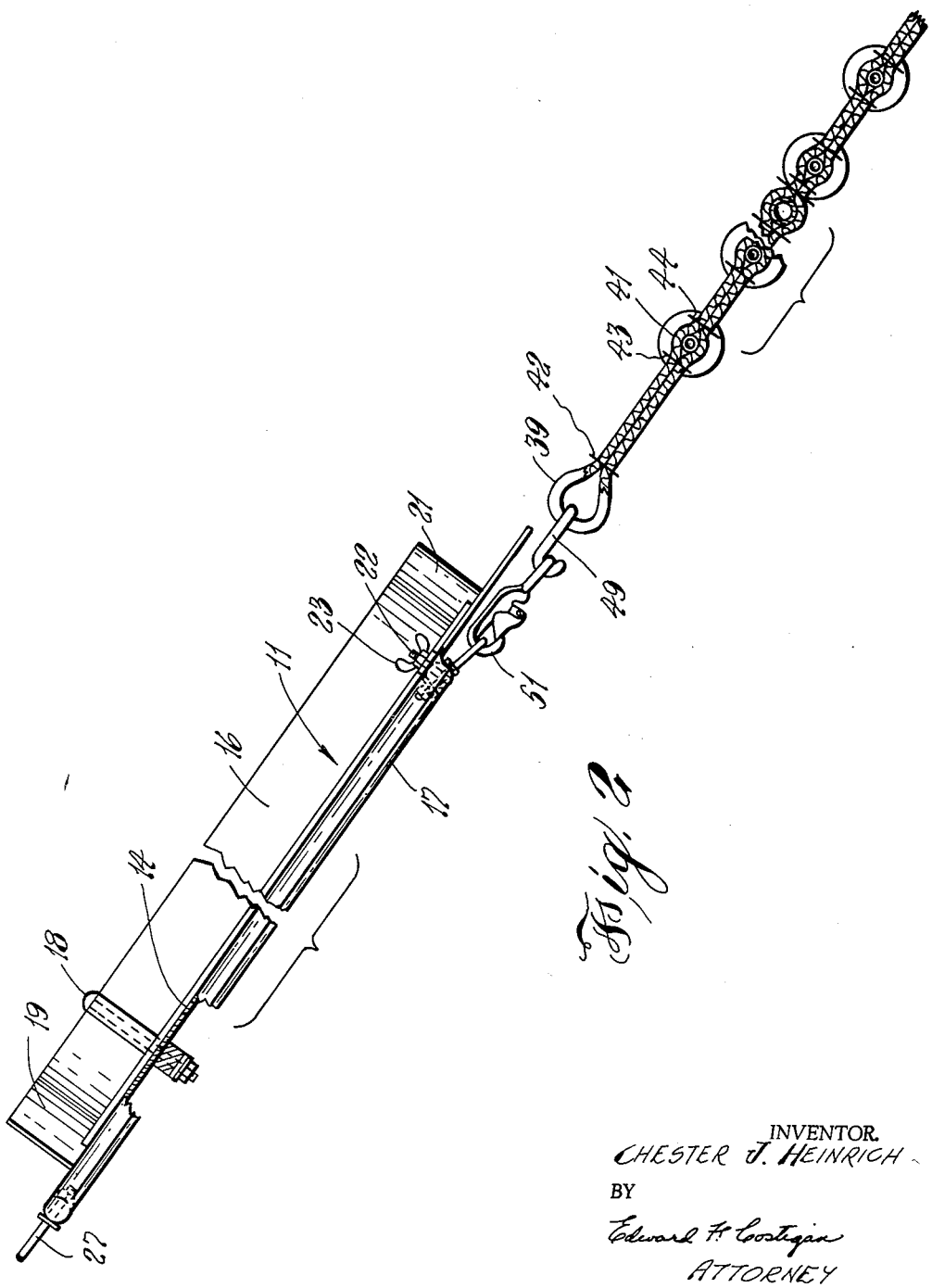
FIG. 2 is a section taken on the line 2—2 of FIG. 1 showing the delivery platform in operative relationship with respect to the conveyor track.

The flexible conveyor track 12 is provided with a plurality of parallel webbing members which function as supports for the bed of antifriction skate-wheel assemblies 33. The system of webbing members, as shown in FIG. 1, consists in a first exterior webbing member 34, a second exterior webbing member 35, and two interior webbing members 36 and 37. All of the webbing members are held in substantially parallel alignment by a plurality of skate wheel assemblies 33 which are transversely supported in spaced relationship between adjacent webbing members. Each of the webbing members 34, 35, 36 and 37 comprise a flexible, substantially inelastic band 38 of a material that has a relatively high durability under the service conditions which are to be anticipated. A nylon webbing of Type XIII, military specification MIL-W-4088B (USAF) of 6000 pounds breaking strength, has been found quite suitable for this purpose. The webbing is doubled and stitched, as shown in FIGS. 1 and 2, to form end loops 39 and a plurality of retaining pockets 41 for the skate wheel support shafts hereinafter described.

The end loop 39 of each of the webbing members is defined by stitch lines 42 and each of the end loops is provided with a triangular hook 49 which is secured to the appropriate U bolt on the delivery platform 11 by means of a snap lock 51. Each of the retaining pockets 41 are defined by stitch lines 43 and 44 with cross stitch lines 45 and 46 bridging a portion of the area between a stitch line 42 and proximate stitch line 43 and crisscross stitch lines 47 and 48 bridging the area between adjacent stitch lines 44 and 43. The retaining pockets 41 in any one webbing member are preferably spaced an equal distance from each other. The cord utilized in the stitching may be a nylon No. 6 cord, Type III, Military Specification MIL-T-7807. Each of the retaining pockets in any one of the webbing members 35, 36, 37 and 38 is interconnected to another retaining pocket in an adjacent webbing member by a skate wheel assembly 33.

Each of the skate wheel assemblies 33, as shown in FIG. 3, comprises a continuous skate wheel support shaft on which is mounted a plurality of revolvable skate wheels 53 which are held in spaced relationship to each other by means of spacer sleeve 54. Each support shaft 52 is adapted to be inserted in a retaining pocket in each of the webbing members 35, 36, 37, and 38 such that each shaft 52 is transversely disposed across the length of each of the four webbing members. The extremital ends 55 and 56 of the support shaft 52 are each provided with a swaging terminal 57 which secures the support shaft in position in the bed of the conveyor track. The support shaft 52, which functions as an axle for the revolvable skate wheels, is flexible in nature and preferably consists of either a steel cable, an aluminum cable, manila rope, a flexible plastic rod, or other similar material which may function as a flexible axle. Due to the fact that the shaft support 52 is flexible, the conveyor track is flexible and tends to form a concave cross section in the shape of an upturned curve whenever a weight is placed on the upper surface of the track. This improves the self-centering action of the cargo and reduces the tendency of the cargo to move off the conveyor track as it progresses down the longitudinal length of the track.

The skate wheels 53 are circular in nature and are provided with a central hub or bore which is adapted to fit on the flexible axle support shaft 52. The outer peripheral surface of the skate wheels extend above the webbing frame of the conveyor to provide an antifriction bed for the article placed on the conveyor. The spacer sleeves 54 are adapted to maintain the skate wheels 53 in spaced relationship along the flexible support shaft 52. The spacer sleeves are in the nature of hollow cylinders of open end construction which are adapted to be mounted on the support shaft 52. Both the skate wheels 53 and the spacer sleeves 54 are made from a light weight plastic or similar type material. In this way, the overall weight of the conveyor track is greatly reduced and the track as a unit is much easier to handle by the operating personnel on board ship.

The overall shape of the flexible conveyor track 12 is maintained in the shape of a concave structure by means of a number of individual rigid ribs 59. Each of the ribs is transversely disposed at spaced intervals across the longitudinal length of the conveyor track. The rigid ribs, which may vary in shape from a shallow concave structure to a trough like structure, may be made from iron, steel, or other material having a strong rigid nature. The preferred embodiment of the rigid rib, as shown in FIG. 4, is provided with a catenary shape. The mid section 61 of the rib is substantially horizontal and the outermost sections 62 and 63 extend upwardly and outwardly from the mid section in the shape of a hypotenuse. The extremital ends 64 and 65 are threaded in order to receive a lock nut 66. As shown, the catenary rib structure 59 passes through the retaining pockets 41 in each of the webbing members 34, 35, 36 and 37, in such a manner that the rib is transversely supported across the longitudinal length of the conveyor track 12. After the rigid rib is insertably mounted on the webbing members, it is secured in place by means of a washer and locking device 66. Due to the fact that the conveyor track is maintained in the shape of a long, shallow channel, there is less tendency for an article to move towards the edge of the conveyor track as it proceeds to the discharge station. Thus, the efficiency of the overall cargo transfer is increased because none of the articles are deposited at a point short of the discharge station and the conveyor system is adaptable for use by the Navy for the transfer of cargo from one ship to another while both are at sea.

Figure 5:
FIG. 5 is a front view of a modified form of a rigid rib for use in a conveyor track of smaller width than that shown in FIG. 4.
Figure 6:
FIG. 6 is a front view of a modified form of a rigid rib for use in a conveyor track having a width intermediate that of the conveyor tracks shown in FIG. 4 and FIG. 5.
Figure 7:
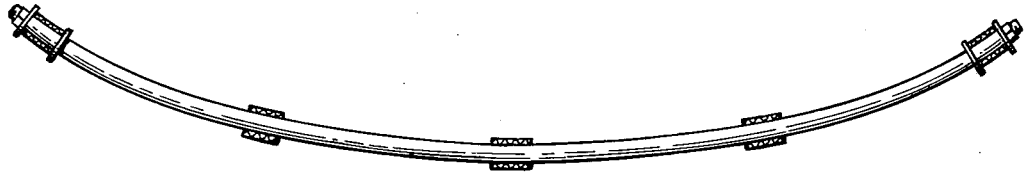
FIG. 7 is a front view of a still further modification of a rigid rib for use in a conveyor track having a width larger than that shown in FIG. 4.

The shape of the rigid rib is susceptible of many modifications as long as the rib functions to form the cross-section of the conveyor track into the shape of a channel. FIGS. 5 to 7 illustrate a few of the shapes which the rib may take depending on the overall width of the conveyor track 12. The exact depth of the channel will depend on the overall width of the conveyor track 12 and the principal type of cargo which the conveyor is destined to transport. It should be noted, however, that the depth of the channel should gradually increase with an increase in the overall width of the conveyor track as shown in FIGS. 5 to 7. This aids in maintaining a package in the center of the track as it progresses longitudinally down the conveyor.

The discharge portion of the flexible conveyor track 12 is operatively connected to the receiving platform 13 of the conveyor in the manner shown in FIGS. 1 and 8. The functions of the platform 13 are to receive the package as it is delivered from the conveyor track 12, to decrease the acceleration of the package when it contacts the platform 13, and to confine the movement of the package to a defined area thereby maintaining the package in an undamaged condition. The receiving platform 13 comprises a base plate 72, a rigid tubular frame 73 affixed to the outer peripheral edge portion of the base plate and means for securing the base plate 72 to the conveyor track 12 and to the discharge station. The base plate 72, which is preferably made from aluminum or other similarly strong material having a light-weight nature, is provided with a rough retarding surface. This may be accomplished if an abrasive such as fused aluminum oxide is rolled into the upper surface of the base plate 72. The acceleration of the package is substantially decreased by this rough surface as the package is received from the conveyor track 12. Due to the decrease in acceleration, the packages are less likely to become damaged because they are less likely to tumble excessively after contacting the upper surface of the platform 73.

The outer peripheral edge portions of the base plate 72 are provided with a rigid tubular frame 73 which functions to strengthen the base plate 72 and to retain packages within a defined area on the upper surface of the base plate. The receiving platform 13 is secured to delivery station through the use of U bolts 74 which pass through the rigid frame 73 while the discharge end of the conveyor track 12 is secured to the receiving platform by means of hooks 68 and U bolts 75. Each of the hooks is secured to the conveyor track by means of an end loop 71 which is formed by overlapping the individual webbing members in the manner heretofore described in connection with end loops 39 at the opposite end of the conveyor track 12. As shown in FIG. 8, the discharge end of the conveyor track may overhang a portion of the receiving platform thereby insuring that the packages coming off the conveyor are delivered to the central area of the receiving platform.

It is apparent from the foregoing description and drawings that I have invented a gravity conveyor of improved construction. This improved conveyor of light weight construction having a cross-section in the form of a long, shallow channel may be used for the transfer of cargo from a ship supply station to a ship receiving station. The transfer of cargo in all cases is made on an efficient basis because none of the transported cargo is discharged at a point short of the receiving station. Obviously, many modifications and variations of the present conveyor are possible in the light of the above teachings. It is therefore to be understood that the invention, as set forth within the scope of the appended claims, may be practiced otherwise than as specifically described.

I claim:
1. A gravity conveyor for use in the transfer of cargo from a supply station to a discharge station comprising
   a supply chute
   a flexible track operatively connected to said supply chute, said track consisting of a multiplicity of anti-friction wheel devices rotatably carried in spaced relationship on a plurality of axles transversely disposed across at least two parallel support members,
   a plurality of ribs having a concave structure transversely supported in spaced relationship across said support members, and
   a receiving platform operatively connected to the discharge end of said flexible track.
2. The combination of claim 1 wherein said flexible track comprises
   two or more parallel support members,
   a plurality of flexible axles transversely disposed through all of said parallel supports,
   a plurality of plastic anti-friction wheel devices rotatably carried on said flexible axles, and a plurality of plastic spacer segments carried on said flexible axles in alternating position with respect to said wheel devices.
3. The combination of claim 2 wherein
   said flexible track is in the form of a long, shallow channel.
4. The combination of claim 1 wherein said receiving platform is intermediate said flexible track and said discharge station,
   said receiving platform comprising a portable base plate,
   a speed retarding upper surface on said base plate,
   means for securing the lower portion of said flexible track in overlapping relationship to said base plate, and
   means for securing said base plate to said discharge station.
5. The combination of claim 4 wherein
   the retarding surface of said base plate comprises a layer of fused aluminum oxide integral with the upper surface of said base plate.
6. The combination of claim 1 wherein said supply chute is intermediate said supply station and said flexible track, said supply chute comprising
   a portable platform having an inclined flat upper surface,
   rods for guiding cargo operatively mounted on the upper surface of said platform,
   means for securing said platform to said delivery station, and
   means for securing the lower portion of the inclined surface of said platform to the upper portion of said flexible track.
7. The combination of claim 1 wherein each of said ribs comprises
   a rigid concave bar-like structure transversely disposed through all of said parallel supports.
8. The combination of claim 1 wherein each of said ribs comprises
   a rigid bar in the shape of a catenary curve transversely disposed through all of said parallel supports.
9. A wheel-type assembly for use in a gravity conveyor comprising
   a plurality of flexible axles,
   a plurality of plastic anti-friction wheels rotatably carried on said flexible axle, and
   a plurality of plastic spacer segments carried on said flexible axle in alternating position with respect to said plastic wheels.
10. A flexible conveyor track in the shape of a long narrow channel comprising
    two or more parallel support members,
    a plurality of flexible axles transversely disposed through all of said parallel supports,
    a plurality of plastic anti-friction wheel devices rotatably carried on said flexible axles, and
    a plurality of plastic spacer segments carried on said flexible axles in alternating position with respect to said wheel devices.
11. The combination of claim 10 including a plurality of rigid ribs of concave structure transversely supported in spaced relationship across said support members.
12. A platform for use in receiving cargo from a conveyor track comprising a portable base plate,
a speed retarding upper surface on said base plate,
means for securing the lower portion of said conveyor track in overlapping relationship to said base plate, and
means for securing said base plate in a stationary position.

13. The combination of claim 12 wherein the retarding surface of said base plate comprises a layer of fused aluminum oxide integral with the upper surface of said base plate.

References Cited in the file of this patent

UNITED STATES PATENTS

| | | |
|---|---|---|
| 1,380,731 | Miller | June 7, 1921 |
| 1,580,615 | Landall | Apr. 13, 1926 |
| 2,733,801 | Dryg | Feb. 7, 1956 |
| 2,920,734 | Heinrich | Jan. 12, 1960 |
| 2,945,335 | Nicolle | July 19, 1960 |